Figure 1:
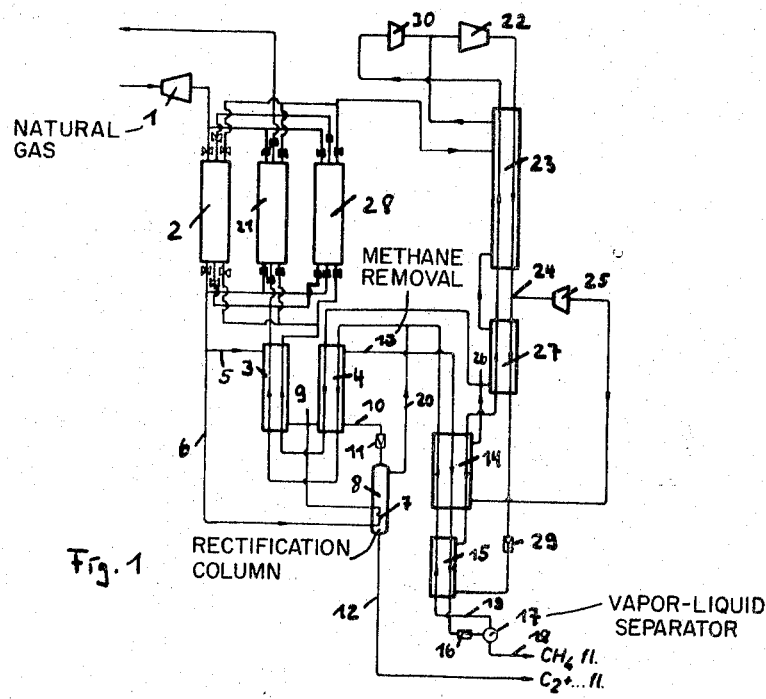

May 9, 1967

F. JAKOB 3,318,103

PROCESS FOR LIQUEFACTION OF C₂ AND HEAVIER
HYDROCARBONS FROM NATURAL GAS WITH
REMOVAL OF CO₂ AND H₂O IMPURITIES

Filed Feb. 24, 1964

United States Patent Office 3,318,103
Patented May 9, 1967

3,318,103
PROCESS FOR LIQUEFACTION OF $C_2$ AND HEAVIER HYDROCARBONS FROM NATURAL GAS WITH REMOVAL OF $CO_2$ AND $H_2O$ IMPURITIES
Fritz Jakob, Achmuhle, Germany, assignor to Gesellschaft für Linde's Eismaschinen Aktiengesellschaft, Hollriegelskreuth, near Munich, Germany
Filed Feb. 24, 1964, Ser. No. 346,640
Claims priority, application Germany, Feb. 23, 1963, G 37,128
12 Claims. (Cl. 62—13)

This invention relates to processes for the liquefaction of natural gas.

According to the locality of its origin, natural gas contains, besides methane and lighter boiling fractions such as nitrogen, considerable amounts of $C_2$ and higher hydrocarbons; additionally, in many instances $CO_2$ and $H_2S$ are contained in variable concentrations.

Carbon dioxide, in particular, causes serious difficulties during the liquefaction of natural gas because it is not readily soluble in the hydrocarbons of natural gas. Special precautions must, therefore, be taken during the liquefaction of natural gas to prevent the separation of solid $CO_2$, which precautions in turn significantly decrease the rate of liquefaction. The total $CO_2$ contained in the crude gas reappears in the liquid phase which becomes considerably enriched therewith. Furthermore, during the step of decompressing the liquid to the pressure in the container, the solubility of the $CO_2$ drops to almost zero because of the lowered temperature, and the $CO_2$ then settles as a massive sediment in the natural gas storage tanks, causing operational difficulties.

Ideally, a better method of eliminating the difficulties caused by the presence of $CO_2$ in natural gas consists in removing the $CO_2$ from the natural gas by chemical or physical cleaning prior to liquefaction. This can be done, if necessary, with a removal of the $H_2S$, at the well head, or in a separate unit ahead of the liquefaction plant. In the first-mentioned case the installation that would be necessary for the simultaneous removal of $H_2S$ and $CO_2$ is considerably larger and has to be of more expensive construction than that which would be necessary for scrubbing out the $H_2S$ alone. In the second case, it would be necessary to construct a scrubbing unit which would be independent of the liquefaction plant and which would require additional expenditures to construct and maintain it. Consequently, excessive expenditures are required for any straightforward system for eliminating the $CO_2$ prior to liquefaction.

The presence of $C_2^-$ and other higher boiling hydrocarbons in liquefied natural gas is also disadvantageous because there is an inefficient use of expensively insulated container capacity especially designed for methane. Likewise, in tankers, this amounts to a waste of that costly ship space designed for the low specific gravity of liquid methane. Furthermore, the $C_2^-$ and higher hydrocarbons, if liquefied together with the methane, can eventually be used only together with the methane as a fuel (possibly also as a starting material for hydrogen production); whereas if they are produced as a separate fraction, they can also be converted into valuable olefins by cracking.

A principal object of this invention therefore is to provide a process for liquefying natural gas by the simplest possible method into substances which under suitable conditions can be further utilized, and by which the difficulties resulting from the presence of $CO_2$ can be eliminated.

Upon further study of the specification and claims other objects and advantages of the present invention will become apparent.

To attain these objects, there is provided a process comprising the steps of first completely freezing out the water and any $CO_2$ from the natural gas, then in a second cooling step condensing and separating the $C_2^-$ and higher hydrocarbons, and finally in a third cooling step further cooling and liquefying practically pure methane and lighter boiling components which have remained after the separation of the $C_2^-$ and higher hydrocarbons. The liquefaction of the methane is then preferably followed by decompression to yield even colder methane vapor.

Figure 2:
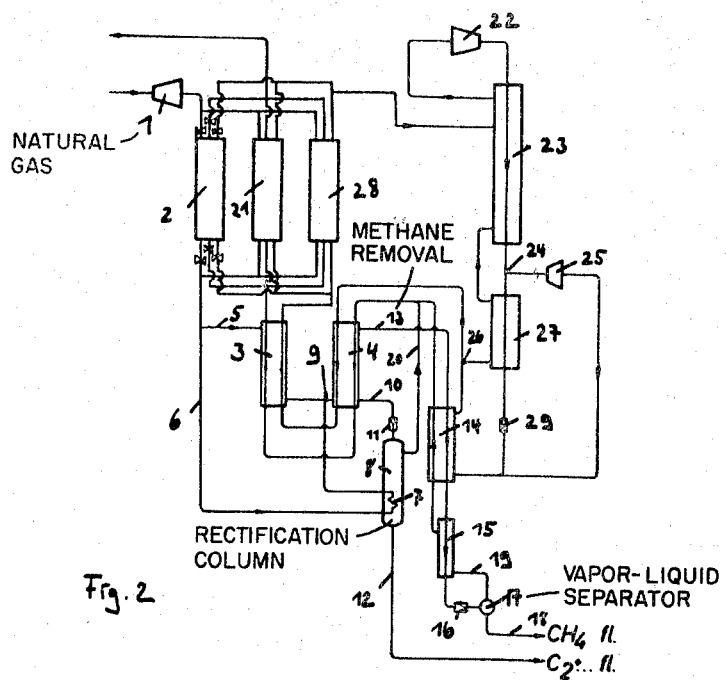

The invention is further illustrated by the accompanying drawing in which:

FIGURES 1 and 2 are schematic flowsheets depicting different highly detailed preferred embodiments of this invention, according to the conditions of use of the process.

The optimum pressure to be used in this process is 2 to 25 atm., and preferably 4 to 15 atm. (all pressures are absolute).

The cooling in the first stage is effected in reversible heat exchangers, e.g. in regenerators or reversing exchangers, and must be sufficient so that the $CO_2$ which leaves this stage will dissolve in the liquid which separates in the second stage; otherwise difficulties will result from the separation of solid $CO_2$ during subsequent operations. At the same time the temperature must be so chosen that during this first stage there will be as little liquefaction of hydrocarbons as possible to keep the amount of hydrocarbons lost with the scavenging gas as low as possible. In accordance to the content of the $C_2^-$ and higher hydrocarbons the temperature may range between $-50°$ C. and $-135°$ C. The former temperature applies to gas rich in $C_2^-$ and higher hydrocarbons, the latter to gas poor in $C_2^-$ and higher hydrocarbons.

According to a preferred embodiment of the invention, the condensate forming during the second cooling stage is separated from the gas phase in a reflux countercurrent heat exchanger through which the condensate flows to the warm end in countercurrent to the crude gas stream. The liquid which leaves this second stage reflux countercurrent heat exchanger usually contains methane or lighter boiling components which are preferably driven off in a separate apparatus which, according to the required degree of separation may be a rectifier or a still in which the liquid is kept continually at boiling temperature. In the case where natural gas which contains $CO_2$ is being treated, the methane and lighter boiling components are separated sufficiently and the boiling point sufficiently elevated thereby that the $CO_2$ which is present will be soluble in the liquid consisting of $C_2^-$ and higher hydrocarbons.

For natural gases which contain many $C_2^-$ and higher hydrocarbons, the lowest temperature in the second cooling stage is so chosen that practically only the $C_2^-$ and higher hydrocarbons are liquefied, without the methane and lighter boiling components going into solution.

If the process is preformed in such a manner that the natural gas which has been freed from $C_2^-$ and higher hydrocarbons is liquefied in the third cooling stage but not decompressed, then care must be taken that the liquid which has been separated during the second cooling stage will be sufficiently freed from the methane and lighter boiling components that the escaping gas will suffice for scavenging the reversible heat exchangers.

On the other hand, if the liquid which was formed during the third cooling stage is subjected to decompression by throttling, for example, then the temperature at which the liquid is passed to the throttle valve must be chosen in such a manner that with the gas which is formed during the decompression, and possibly together with that which was driven off from the liquefied $C_2^-$ and higher hydrocarbons, the reversible heat exchangers can be scavenged. The amount of scavenging gas should also be such that the combustion turbine will more or less cover the energy requirements of the liquefaction plant.

The necessary cold for the liquefaction plant is provided by an internal refrigerating cycle comprising the compressor and the expansion turbine. The cold produced in this manner can be delivered by various methods to the gas to be liquefied.

If the liquefaction is to be as complete as possible, then according to this invention the compressed gas, which has been cooled by countercurrent circulation with itself, is divided into two unequal portions. The larger portion, preferably about 85%, is expanded to an intermediate pressure in a turbine while doing work, and is then brought into heat exchange with the gas to be liquefied and then with the unexpanded remainder of the circulating gas, the latter being then expanded by throttling to approximately atmospheric pressure and brought into heat exchange with the gas to be liquefied which has been cooled by the cycle gas having been expanded while doing work. The circulating gas which is now practically without pressure, is then further warmed and given an initial compression, after which it is mixed with the circulating gas that has been expanded to an intermediate pressure and likewise warmed up, the mixture being then compressed to the initial pressure.

A portion of the cold which is produced during work-performing expansion at relatively higher temperature is delivered directly to the gas to be liquefied while the remainder of the cold is delivered to the non-expanded circulating gas which is then expanded by throttling to bring this cold to the lowest required temperature for delivery to the gas to be liquefied.

If there is a need for large amounts of fuel not under pressure, and if the higher hydrocarbons under favorable market conditions can be sold, then it is preferable to liquefy only a small portion of the gas, and the rate of liquefaction can then be kept smaller. According to this invention, the compressed gas which has been cooled by countercurrent circulation with itself is separated into two unequal portions. The main portion, preferably about 85%, is expanded while doing work, while the remainder is expanded through a throttle valve to an intermediate pressure. Both portions are then recombined, are brought into heat exchange with the gas to be liquefied and then with the non-expanded smaller portion of the circulating gas, and then after being warmed by countercurrent heat exchange with itself are again compressed to the initial temperature.

By this method the total cold which is produced at a relatively high temperature is transferred at this temperature to the gas to be liquefied, and the latter solely serves to transfer the cold to the lowest required temperature level.

Since regenerators and reversing exchangers cannot tolerate excessive differences of temperature to be used for heat exchange, it is necessary that the gases between which there is a heat exchange should have about equal heat capacities, so that a substitute for the liquefied gas must be found. The present invention accomplishes this by diverting a portion of the circulating gas which has been expanded to an intermediate pressure after heat exchange with the gas to be liquefied. The diverted portion is warmed in countercurrent to the gas to be cooled during the second cooling stage, is then passed in a direction opposite to the direction of the crude gas through that reversible heat exchanger that was scavenged during the preceding period and is then mixed with the circulating gas which has been expanded to an intermediate pressure and at a place where the temperatures are the same.

A main advantage of this process the predominant feature of which is the separation of the $C_2^-$ and higher hydrocarbons prior to the liquefaction of the methane is that the higher hydrocarbons are made available for useful purposes other than to be used merely as fuel or as crude material for the production of hydrogen. Firstly, they possess a much greater heating value than methane. Furthermore, because of their higher boiling points they can be deposited and transported in less expensive and less insulated containers which cost about one-third less than containers for methane. Because of their higher specific gravities, they also require less storage space per kg. of liquid and less expensive shipping space than methane. Furthermore, the higher hydrocarbons can also be converted into valuable olefins by relatively simple cracking processes. From such olefin-containing fractions obtained from natural gas, it is also possible, because of their relative freedom from readily polymerizable components, to obtain pure products more easily than from fractions obtained from light oil or benzine.

A further important advantage consists in that the $CO_2$-containing natural gas be liquefied without difficulty and that the $CO_2$ can be delivered to the $C_2^+$ fraction and kept in solution therein and without the expense of additional apparatus or energy during the liquefaction process.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

With reference to FIGURES 1 and 2 which differ from each other with respect to the internal refrigeration cycle, it is to be noted that corresponding parts are designated by the same numerals.

Natural gas under a pressure of 20–40 atmospheres, freed from $H_2S$, and pre-dried has the following composition: 5.52% $N_2$, 83.6% $CH_4$, 7.65% $C_2H_6$, 2.08% $C_3H_8$, 0.95% $C_4H_{10}$ and higher hydrocarbons and 0.2% $CO_2$. This crude gas is expanded in turbine 1 down to 10 atm. and is thereby cooled to about −20° C. In the regenerator 2 belonging to the first cooling stage, the gas is further cooled to −73° C. with the separation of all the water, a portion of the $CO_2$ and also a slight amount of higher hydrocarbons.

Most of the gas (e.g. about 90%) which leaves the first cooling stage is delivered by conduit 5 to the heat exchanger 3 of the second cooling stage, while the remainder of it passes through conduit 6, first through the condenser-vaporizer 7 of the rectification column 8 in which there will occur a partial liquefaction of the previously cleaned crude gas. The latent heat of condensation which is liberated here serves to boil off the liquid in the sump of column 8.

The two divided streams 5 and 6 are recombined at the junction 9 and are delivered to the reflux countercurrent heat exchanger 4 serving more or less as a partial condenser, wherein the condensate of $C_2^-$ and higher hydrocarbons which form in 4 flow to the warm end in countercurrent to the incoming gas, thereby also serving as a reflux liquid for the ascending gas. The temperature at the cold end of reflux branch reaches −125° C. It is so chosen that under the prevailing pressure of 10 atm. practically all the $CO_2$ which was not held back in the regenerator will be washed out; the condensate which forms in the reflux branch contains under these conditions also some $CH_4$ and $N_2$.

The condensate is drawn off at 10, is expanded to about 1.3 atm. in the valve 11, and is delivered to the rectification column 8. Here the liquid is freed from methane and $N_2$ sufficiently to enable the remaining $CO_2$ to remain in solution in the $C_2^+$ fraction which is no longer under pressure. The sump temperature of the column 8 must for this purpose be kept at the relatively higher temperature of about −100° C. For this purpose, as stated above, the latent heat that is liberated by the partial liquefaction of the crude gas in conduit 6 is used. The purified fraction composed of $C_2^-$ and higher hydrocarbons and dissolved $CO_2$ is removed by conduit 12.

The gaseous portion which remains in the countercurrent exchanger 4 is delivered by conduit 13 to the heat exchangers 14 and 15 belonging to the third cooling stage where it is cooled to −156° C. and liquefied. It is then expanded in valve 16 to about 1.3 atm. during which the temperature sinks further to −165° C. The volume of the resulting gas is so great that during the period for flushing the regenerators, the condensed impurities are removed completely. This is necessary because during the next period pure gas is used for cooling the regenerator to the low temperature that is required for cooling the crude gas.

In the separator 17 the gas is separated from the liquid. The latter consists of practically pure methane and is removed by conduit 18. The gas from the separator 17 is removed by conduit 19 and is passed through heat exchangers 14 and 15 and then, together with the gaseous portion which leaves the rectification column 8 through conduit 20, it is passed through heat exchangers 4 and 3 and is finally conducted away through regenerator 21 which is thereby scavenged.

The cold which is necessary for liquefaction is produced by a methane cycle. The circulating methane is brought by the compressor 22 to 20 atm. It is then cooled in the heat exchanger 23 and divided into two portions at the junction 24. The main portion is expanded in the turbine 25 to 5 atm. The cold which is here produced at a relatively high temperature is delivered in the countercurrent exchanger 14 to the gas to be liquefied, and after division at the junction 26 is delivered in the heat exchanger 27 in indirect heat exchange contact with the circulating gas which is not yet expanded. This main portion, after passing through heat exchanger 23, is returned to the compressor 22.

The methane which was separated at the junction 24 from the main portion is passed through heat exchanger 27 and is expanded through valve 29 to slightly more than atmospheric pressure. The cold which was imparted to it in heat exchanger 27 is thereby brought down further to the lowest required temperature of −156° C. which is then imparted in the heat exchanger 15 to the gas to be liquefied.

The throttle-expanded circulating gas after passing through heat exchangers 14, 27 and 23, is delivered to the precompressor 30 and from there to the compressor 22.

The circulating gas which has been diverted from 26 is passed through the heat exchangers of the second cooling stage in countercurrent relation to the crude gas, and then through the regenerator 28 from where it is delivered to heat exchanger 23 in which it is mixed with the workperformingly expanded circulating gas, and the mixture then returned to the compressor 22. The regenerator 28 is cooled by the circulating methane sufficiently to permit its use for cooling the crude gas.

By the use of the process of FIGURE 1, about 81% of the gas that is delivered to the apparatus is liquefied.

An essential part of the task of transferring the cold produced at a relatively high temperature by the expansion of the cycle methane in the turbine to the lowest required temperature level is taken over by the gas to be liquefied. This means that a relatively big part of the cycle gas can be fed to the turbine and that only a small part, namely the throttle-expanded quantity, is also engaged in the above cold transfer process. This becomes clearly noticeable in the energy requirement which is now only 4.3 w./cal. during normal compression. It could be lowered still further by the use of higher pressures in the closed circuit. The energy gain during expansion of the natural gas from the delivery pressure of about 20–40 atm. to the process pressure of 5–15 atm. is not taken into consideration.

The process of FIGURE 2 differs from that of FIGURE 1 only in that the total cold is delivered to the gases to be liquefied at the temperature at which it is generated while the requirement of bringing this temperature down to the lowest required temperature level is imposed only on the natural gas itself. Hence in contrast to FIGURE 1, the portion that is diverted at 24 from the main circulation is expanded in the valve 29 to the same pressure that is arrived at in the turbine 25, namely to 5 atm., and together with that which has been expanded while doing work, is passed through the heat exchanger 14 for transmitting the generated cold to the gas to be liquefied. The cooling of the natural gas in the heat exchanger 15 is accomplished only by the gas that is returned by the separator 17 after having been expanded in the valve 16. A precompressor is therefore not required.

The rate of liquefaction is therefore reduced to about 48%. This process is preferably used when there is need for higher hydrocarbons and/or when the large remaining amount of gas that is not under pressure can be used for heating or for power.

For a further understanding of the economics involved, reference is directed to the following tables:

TABLE 1.—MATERIAL BALANCE FOR FIG. 1

|  | Natural gas | | $C_2^+$... fractions | | $CH_4$- fraction | | Recycle (purge) gas | |
| --- | --- | --- | --- | --- | --- | --- | --- | --- |
|  | Percent | Nm.³ | Percent | Nm.³ | Percent | Nm.³ | Percent | Nm.³ |
| $N_2$ | 5.52 | 6,810 | 0 | 0 | 3.58 | 3,209 | 15.42 | 3,601 |
| $CH_4$ | 83.60 | 103,176 | 5.11 | 526 | 96.31 | 86,403 | 69.55 | 16,247 |
| $C_2H_6$ | 7.65 | 9,440 | 77.86 | 8,016 | 0.10 | 91 | 5.71 | 1,333 |
| $C_3H_8$ | 2.08 | 2,565 | 14.55 | 1,499 |  | 0 | 4.56 | 1,066 |
| $C_4H_{10}$ | 0.95 | 1,122 | 0.39 | 40 |  | 0 | 4.63 | 1,082 |
| $CO_2$ | 0.20 | 247 | 2.09 | 210 | 0.01 | 6 | 0.13 | 31 |
| Total | 100.00 | 123,360 | 100.00 | 10,291 | 100.00 | 89,709 | 100.00 | 23,360 |

TABLE 2.—MATERIAL BALANCE FOR FIG. 2

|  | Natural gas | | $C_2^+$... fractions | | $CH_4$- fraction | | Recycle (purge) gas | |
| --- | --- | --- | --- | --- | --- | --- | --- | --- |
|  | Percent | Nm.³ | Percent | Nm.³ | Percent | Nm.³ | Percent | Nm.³ |
| $N_2$ | 5.52 | 9,260 | 0 | 0 | 0.40 | 340 | 13.18 | 8,920 |
| $CH_4$ | 83.60 | 140,210 | 5.11 | 729 | 99.46 | 85,538 | 79.74 | 53,943 |
| $C_2H_6$ | 7.65 | 12,830 | 77.86 | 10,884 | 0.14 | 124 | 2.69 | 1,822 |
| $C_3H_8$ | 2.08 | 3,490 | 14.55 | 2,038 |  | 0 | 2.15 | 1,452 |
| $C_4H_{10}$ | 0.95 | 1,525 | 0.39 | 54 |  | 0 | 2.18 | 1,471 |
| $CO_2$ | 0.20 | 335 | 2.09 | 285 |  | 8 | 0.06 | 42 |
| Total | 100.00 | 167,650 | 100.00 | 13,990 | 100.00 | 86,010 | 100.00 | 67,650 |

TABLE 3.—ENERGY BALANCE

| | Fig. 1, Kw. | Fig. 2, Kw. |
|---|---|---|
| Circulating compressor | +70,600 | +71,200 |
| Precompressor | +2,970 | 0 |
| Natural gas turbine | −2,740 | −3,720 |
| Circulating turbine | −1,450 | −1,460 |
| Total | 69,380 | 66,020 |
| Recycle gas compression | +2,860 | +8,320 |
| Total | 72,240 | 74,340 |

Table 1 gives the material balance of the process of FIGURE 1, and Table 2 the material balance of FIGURE 2. Both are based on the amount of liquid obtained from 100,000 Nm.$^3$/hour of gas, which in the first case amounts to about 1800 Nm.$^3$/h. and in the second case to about 1860 Nm.$^3$/h. of liquid. Table 3 shows the corresponding energy balance. The positive values, consisting of the energy requirements of the cycle compressor and of the precompressor, together with the negative values consisting of the energy liberated by the natural gas and the expansion turbine of the closed circulation, give for FIGURE 1 an energy requirement of 69,380 kw., and for FIGURE 2 a requirement of 66,020 kw. That the second value is smaller than the first, does not however correspond to the actual value of the process. For a valid comparison, it would be necessary to include on the plus side of the balance the energy requirement which results from the necessity of compressing the liberated gas which is not under pressure to 10 atm. If this were done, then the numbers 72,240 and 74,340 kw. would be obtained which form a more realistic basis for comparison.

The process of this invention can also be advantageously used for natural gas with small amounts of higher hydrocarbons. In that case the $CO_2$ separation is accomplished to a large extent in the regenerators. For economic considerations, the limiting conditions would be where the gas consists only of $CO_2$, $CH_4$ and $N_2$. A very simple installation operating at about 4 atm. could then be used, which could work with $CO_2$ contents of 15% or more.

The process of this invention can also be used with natural gas having a much larger content of higher hydrocarbons than that given in the example. There will then be a greater separation of the higher hydrocarbons in the regenerators. The upper limit for practical purposes would be reached with gases containing 15–20% of higher hydrocarbons. With larger amounts it would be very difficult to obtain economically satisfactory operation of the regenerators.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A process for the liquefaction of natural gas containing methane and minor amounts of water vapor, carbon dioxide, and $C_2$ and higher paraffinic hydrocarbons, said natural gas being substantially devoid of unsaturated hydrocarbons, which process comprises the steps of:
  (a) passing the natural gas through a first cooling stage in a reversible heat exchanger at a temperature sufficiently low to freeze out the water vapor, a portion of the $CO_2$, and a minimum amount of hydrocarbons;
  (b) passing the resultant dry gas through a second cooling stage at a temperature sufficiently low to condense substantially all of the $C_2$ and higher paraffinic hydrocarbons, and a minimum amount of methane; and
  (c) passing the resultant methane-containing gas through a third cooling stage at a temperature sufficiently low to liquefy said resultant methane-containing gas, with the additional provision that the temperature in the first stage is maintained so that any $CO_2$ remaining in the gas phase after said first stage is soluble in the condensate obtained in the second stage.

2. The process of claim 1, further comprising a step of decompressing the liquefied methane-containing gas whereby a portion thereof is flash evaporated and cooled, resultant cooled vapor portion being employed as scavenger gas to sublime and remove frozen $H_2O$ and $CO_2$ from said reversible heat exchanger, and resultant cooled liquid portion being stored in an insulated container.

3. The process of claim 2, wherein the process steps are conducted under an absolute pressure of about 2–25 atmospheres.

4. The process of claim 1, further comprising the step of distilling the condensate obtained in the second stage to remove methane and lighter boiling components contained therein.

5. The process of claim 4, further comprising the step of recycling the methane and lighter boiling components to the first cooling stage to purge the frozen water therefrom.

6. A process for the liquefaction of natural gas containing methane and minor amounts of water vapor, carbon dioxide, and $C_2$ and higher hydrocarbons, which process comprises the steps of:
  (a) passing the natural gas through a first cooling stage at a temperature sufficiently low to freeze out the water vapor;
  (b) passing the resultant dry gas through a second cooling stage at a temperature sufficiently low to condense substantially all of the $C_2$ and higher hydrocarbons; and
  (c) passing the resultant methane-containing gas through a third cooling stage at a temperature sufficiently low to liquefy said resultant methane-containing gas, with the additional provision that the temperature in the first stage is maintained so that any $CO_2$ remaining in the gas phase after said first stage is soluble in the condensate obtained in the second stage,
  wherein the third cooling stage is conducted in two heat exchangers, the first being a precooler and the second being a condenser, and wherein these two heat exchangers are cooled by an internal methane refrigeration cycle comprising the steps of dividing a compressed methane refrigerant into a main portion and a minor portion; expanding the main portion to an intermediate pressure above one atmosphere absolute while doing external work, whereby said main portion is cooled; passing the resultant cooled main portion into the precooler in indirect heat exchange contact with the methane stream in process entering the third stage; expanding the minor portion of the compressed methane refrigerant to about one atmosphere absolute; and passing the expanded minor portion into the condenser in indirect heat exchange contact with the precooled methane stream in process whereby the process methane is liquefied.

7. The process of claim 6, further comprising the steps of: passing the expanded minor portion out of the condenser and into the precooler in indirect heat exchange contact with both the process methane and the intermediate pressure refrigerant methane; precompressing the resultant heated minor portion from the precooler; and further compressing the precompressed minor portion admixed with the warmed intermediate pressure refrigerant methane to the top pressure in the cycle.

8. The process of claim 1, wherein the third cooling stage is conducted in two heat exchangers, the first being a precooler, and the second being a condenser, and wherein only the precooler is cooled by an internal methane refrigeration cycle comprising the steps of:
(1) dividing a compressed methane refrigerant into a main portion and a minor portion;
(2) expanding the main portion to an intermediate pressure while doing external work;
(3) throttle expanding the minor portion to said intermediate pressure;
(4) combining both expanded portions;
(5) passing the resultant combined expanded portions into the precooler in indirect heat exchange contact with the methane in process;
(6) withdrawing the resultant heated combined portions from the precooler, and passing said portions in indirect heat exchange contact with the minor portion prior to the throttle expansion thereof;
(7) passing the combined portions from step (6) into indirect heat exchange contact with the methane refrigerant prior the division thereof; and
(8) compressing the resultant heated combined streams to original pressure of the refrigerant in step (1).

9. The process of claim 6, further comprising the steps of diverting a portion of the methane refrigerant withdrawn from the precooler, and passing the diverted portion into the second cooling stage in indirect heat exchange contact with the natural gas stream in the second cooling stage.

10. The process of claim 8, further comprising the steps of diverting a portion of the methane refrigerant withdrawn from the precooler, and passing the diverted portion into the second cooling stage in indirect heat exchange contact with the natural gas stream in the second cooling stage.

11. The process of claim 9, wherein the first cooling stage is accomplished in reversible exchangers, and further comprising the steps of passing the diverted portion of refrigerant from the second cooling stage through a reversible exchanger previously purged during the preceding period, and then mixing the diverted portion with the circulating methane gas which has been expanded to an intermediate pressure and at a place where the temperatures are the same.

12. The process of claim 10, wherein the first cooling stage is accomplished in reversible exchangers, and further comprising the steps of passing the diverted portion of refrigerant from the second cooling stage through a reversible exchanger previously purged during the preceding period, and then mixing the diverted portion with the circulating methane gas which has been expanded to an intermediate pressure and at a place where the temperatures are the same.

References Cited by the Examiner

UNITED STATES PATENTS

| | | |
|---|---|---|
| 2,495,549 | 1/1950 | Roberts. |
| 2,591,658 | 4/1952 | Haringhuizen _____ 62—23 |
| 2,716,332 | 8/1955 | Haynes. |
| 2,909,904 | 10/1959 | Hasche _____ 62—23 |
| 2,940,271 | 6/1960 | Jackson _____ 62—23 X |
| 3,076,318 | 2/1963 | Becker. |

FOREIGN PATENTS 822,122 10/1959 Great Britain.

NORMAN YUDKOFF, *Primary Examiner.*

V. W. PRETKA, *Assistant Examiner.*